(12) United States Patent
Furuta et al.

(10) Patent No.: US 7,505,160 B2
(45) Date of Patent: Mar. 17, 2009

(54) PAPER IDENTIFICATION INFORMATION MANAGEMENT SYSTEM

(75) Inventors: Toshiyuki Furuta, Kanagawa (JP); Taiga Asano, Kanagawa (JP); Tomohiko Beppu, Kanagawa (JP); Nobuyuki Doi, Tokyo (JP); Hitoshi Hattori, Kanagawa (JP); Sadao Takahashi, Kanagawa (JP); Makoto Yamasaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1031 days.

(21) Appl. No.: 10/411,308

(22) Filed: Apr. 11, 2003

(65) Prior Publication Data

US 2004/0024847 A1 Feb. 5, 2004

(30) Foreign Application Priority Data

Apr. 11, 2002 (JP) ............... 2002-109168
Apr. 7, 2003 (JP) ............... 2003-103133

(51) Int. Cl.
*G06F 15/00* (2006.01)
*G06F 7/00* (2006.01)

(52) U.S. Cl. ..................... 358/1.15; 700/213

(58) Field of Classification Search ........... 358/1.15, 358/1.13, 1.14, 1.18, 504, 474, 462, 1.1, 358/3.28; 709/203, 230; 399/43, 45, 130; 235/375, 454; 715/505; 271/3.13, 207, 228; 700/213

See application file for complete search history.

(56) References Cited

U.S. PATENT DOCUMENTS

| | | | |
|---|---|---|---|
| 5,349,646 A | 9/1994 | Furuta et al. | |
| 5,544,269 A | 8/1996 | Hattori | |
| 5,588,090 A | 12/1996 | Furuta et al. | |
| 5,825,937 A | 10/1998 | Ohuchi et al. | |
| 5,902,968 A | 5/1999 | Sato et al. | |
| 5,911,004 A | 6/1999 | Ohuchi et al. | |
| 5,981,884 A | 11/1999 | Sato et al. | |
| 6,084,577 A | 7/2000 | Sato et al. | |

(Continued)

FOREIGN PATENT DOCUMENTS

JP 07-141104 6/1995

(Continued)

OTHER PUBLICATIONS

U.S. Appl. No. 10/891,364, filed Jul. 15, 2004, Furuta et al.

(Continued)

*Primary Examiner*—Saeid Ebrahimi Dehkordy
(74) *Attorney, Agent, or Firm*—Oblon, Spivak, McClelland, Maier & Neustadt, P.C.

(57) ABSTRACT

A paper identification information management system includes a client apparatus that handles a sheet of paper bearing prescribed information, and a management server connected to the client apparatus via a network to comprehensively manage information about the paper handled in the client apparatus. The client apparatus transmits a paper ID request and document information to the management server via the network when carrying out a printing operation. Based on the paper ID request and the document information, the management server assigns a paper ID to each sheet of paper handled by the client apparatus. The management server then transmits the paper IDs to the client apparatus, and simultaneously, records the assigned paper IDs in association with the document information.

8 Claims, 12 Drawing Sheets

U.S. PATENT DOCUMENTS

| | | | |
|---|---|---|---|
| 6,229,102 | B1 | 5/2001 | Sato et al. |
| 6,432,518 | B1 | 8/2002 | Torii et al. |
| 6,498,964 | B1 * | 12/2002 | Ogura et al. ............... 700/213 |
| 6,518,960 | B2 | 2/2003 | Omura et al. |
| 6,894,792 | B1 * | 5/2005 | Abe ........................ 358/1.15 |
| 2002/0118385 | A1 * | 8/2002 | Nagashima ............... 358/1.15 |
| 2002/0140970 | A1 * | 10/2002 | Kato et al. ................ 358/1.15 |
| 2002/0154332 | A1 * | 10/2002 | Inai et al. .................. 358/1.15 |
| 2003/0104938 | A1 | 6/2003 | Torii et al. |
| 2004/0024847 | A1 | 2/2004 | Furuta et al. |
| 2006/0109494 | A1 * | 5/2006 | Kizaki ....................... 358/1.13 |

FOREIGN PATENT DOCUMENTS

| | | |
|---|---|---|
| JP | 2000-293303 | 10/2000 |

OTHER PUBLICATIONS

U.S. Appl. No. 09/948,956, filed Sep. 7, 2001, Takahashi.
U.S. Appl. No. 10/165,637, filed Jun. 7, 2002, Torii et al.
U.S. Appl. No. 09/338,622, filed Jun. 23, 1999, Takahashi.
U.S. Appl. No. 08/049,522, filed Apr. 19, 1993, Stork et al.
U.S. Appl. No. 09/288,856, filed Apr. 9, 1999, Nagatsuka et al.
U.S. Appl. No. 09/441,051, filed Nov. 16, 1999, Takahashi.
U.S. Appl. No. 09/472,249, filed Dec. 27, 1999, Shimada et al.
U.S. Appl. No. 09/551,466, filed Apr. 17, 2000, Takahashi.
U.S. Appl. No. 09/819,650, filed Mar. 29, 2001, Shioda et al.
U.S. Appl. No. 09/838,248, filed Apr. 20, 2001, Hatori et al.
U.S. Appl. No. 10/006,715, filed Dec. 10, 2001, Numura et al.
U.S. Appl. No. 10/411,308, filed Apr. 11, 2003, Furuta et al.
U.S. Appl. No. 10/936,516, filed Sep. 9, 2004, Asano.

* cited by examiner

FIG.3

ID INFORMATION MANAGEMENT TABLE

| DOCUMENT NAME | PAGE NUMBER | PAPER ID | CLIENT ID | PRINTED TIME |
|---|---|---|---|---|
| http://foo/doc/foo.doc | 1 | 0001 | 192.168.0.1 | 2/1 13:00 |
| http://foo/doc/foo.doc | 2 | 0002 | 192.168.0.1 | 5/10 10:30 |
| http://foo/doc/goo.doc | 1 | 0003 | 192.168.0.3 | 6/7 15:20 |

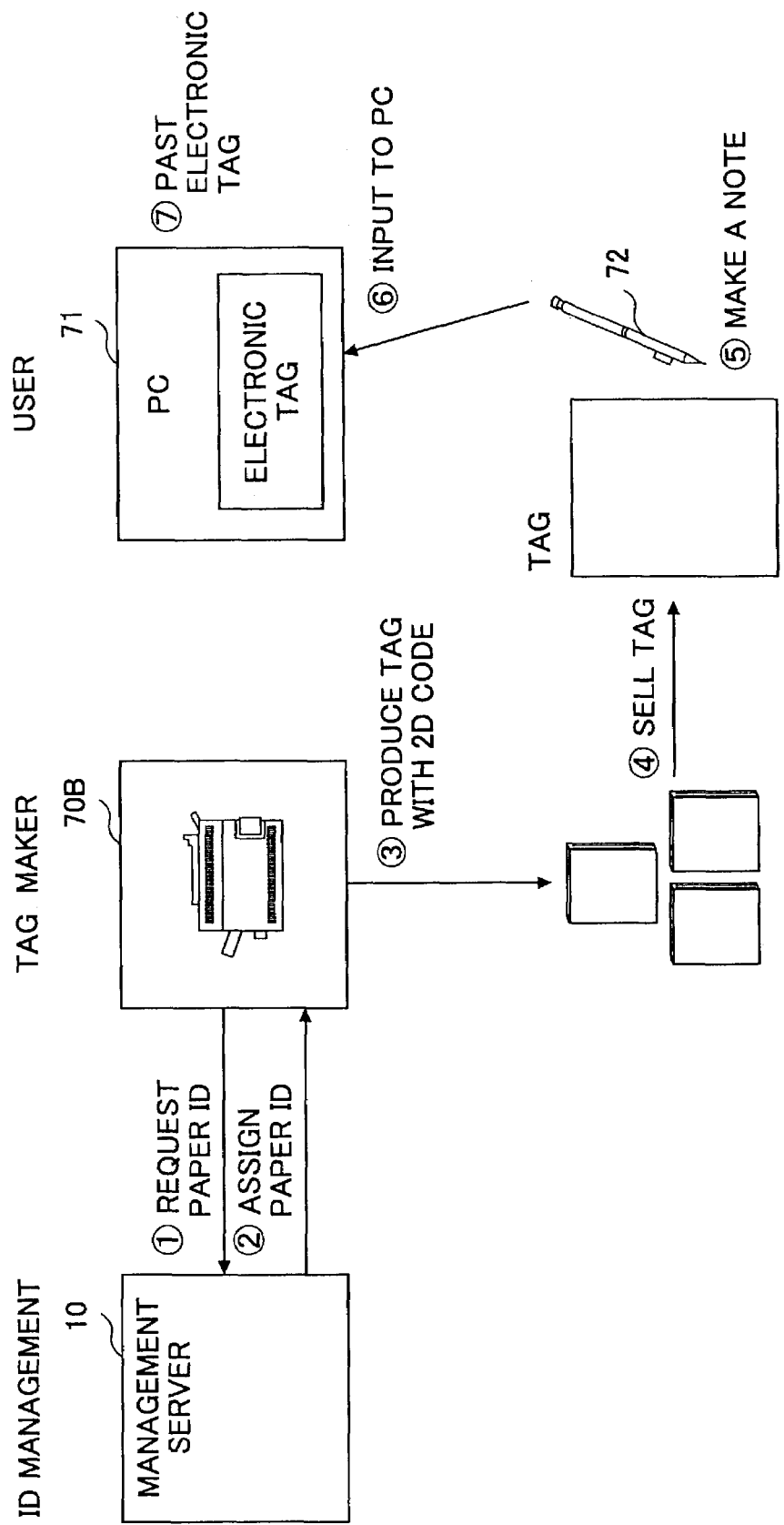

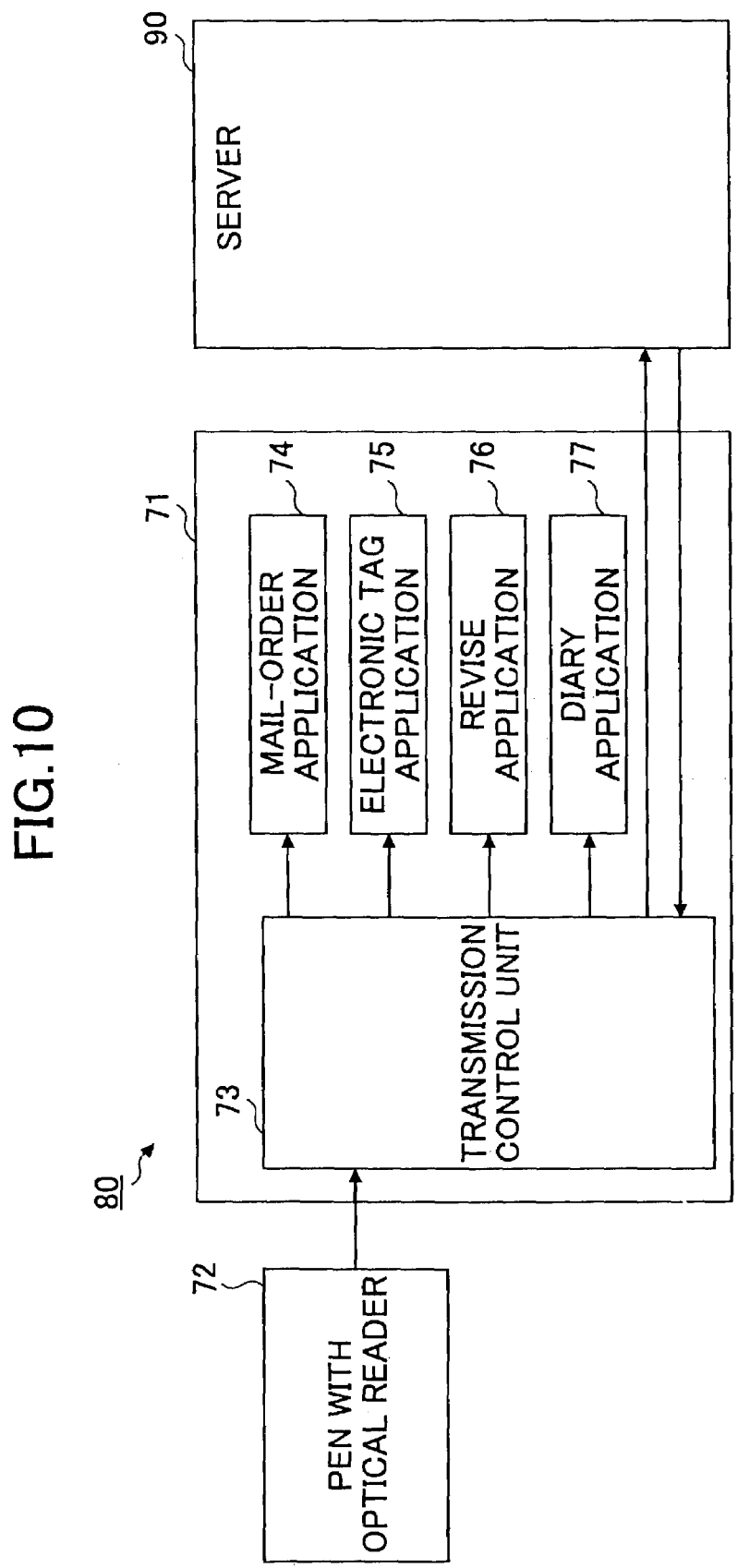

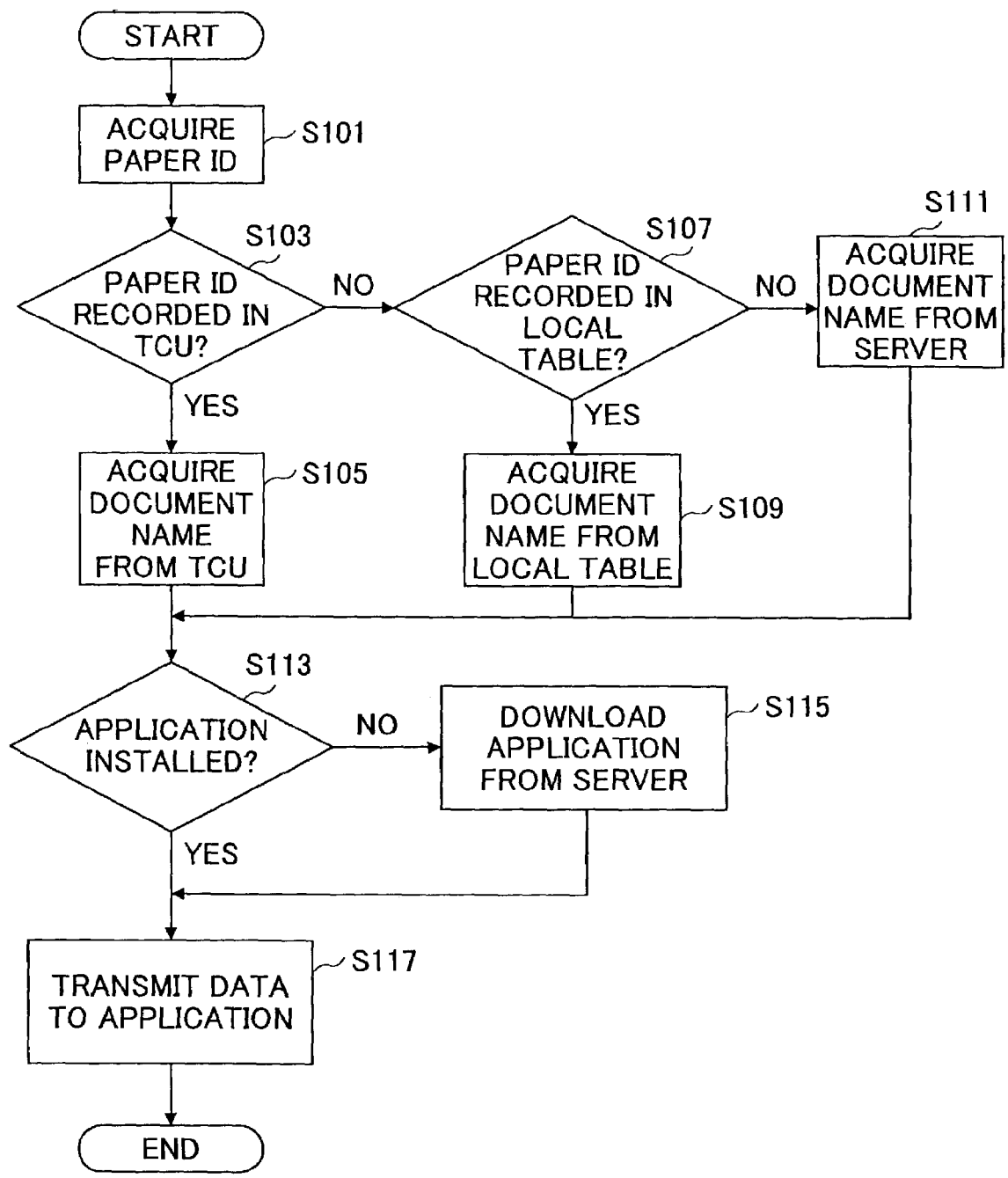

PAPER IDENTIFICATION INFORMATION MANAGEMENT SYSTEM

BACKGROUND OF THE INVENTION

1. Field of the Invention

The present invention relates to a technique for comprehensively managing a mass of papers handled by various client apparatuses, and more particularly, to a system for managing identification information of each sheet of paper in a comprehensive and centralized manner via a network.

2. Description of the Related Art

A technique for acquiring contents designated by an optical pen on a touch panel is already known. For example, JPA7-141104 discloses a technique of detecting the coordinates of the object selected on the panel using an optical pen. Based on the coordinates, the position and contents of the image information associated with the selected object are specified.

On the other hand, another technique for reading handwritten contents from paper in real-time without using a tablet and for combining the electronic data of the handwriting with the original document is disclosed in JPA2000-293303. In this publication, the user can correct and revise the text printed on paper, using a pen having a micro-camera. The paper bears a symbol representing the coordinate information of the paper, which is printed together with the text. As the user writes on the paper, the micro-camera optically reads the symbol and the handwriting from the paper, thereby acquiring the tracks of the handwriting.

In order to specify which document is revised, the document identification (ID) is encoded, and buried in the symbol together with the coordinate information. The document ID is, for example, a local file name or a serial number associated with the file name. In the latter case, the correspondence between the file name and the serial number is recorded in a table or other suitable means.

The table administration employed in this prior art technique premises stand-alone management, and is unsuitable for a network system. This is because the document ID and the associated file name are generally local ones, and therefore, they cannot be used uniquely on the network.

Then, a technique for managing document identification information over a network is proposed in Japanese Patent Application No. 2001-289201, which is commonly assigned to the assignee of the present application. With this technique, access to the management server is unlimited, and accordingly, problems occur in connection with the server resources.

SUMMARY OF THE INVENTION

Therefore, it is an object of the present invention to provide a paper identification information management system that can comprehensively manage a mass of papers handled among a number of client apparatuses, while monitoring the access status of each client apparatus in order to evenly distribute the server resources to the client apparatuses via a network.

It is another object of the invention to provide a paper identification information management system that has a management hierarchy capable of dispersing the work load on the management server.

It is still another object of the invention to provide a paper identification management server used in the above-described system.

In the above-described system, various types of equipment can be connected as client apparatuses to the server. For example, an intelligent printer furnished with a printing function and a data-processing ability can be a client apparatus. Alternatively, a combination of a personal computer and a user printer can also be a client apparatus. In addition, a data processor with an optical reader for reading information from the paper can be a client apparatus.

Accordingly, it is yet another object of the invention to provide a client apparatus that is capable of appropriately processing the data read from the paper in compliance with the purpose.

To achieve the objects, the present invention employs a network structure in which a variety of client apparatuses are connected to the management server. The management server assigns unique paper identification to each sheet of paper handled by a client apparatus. The management server records the paper identifications assigned to each client apparatus in association with corresponding document information used in the client apparatus, thereby constituting a comprehensive management system.

In one aspect of the invention, a paper identification information management system includes a client apparatus that handles a sheet of paper bearing prescribed information, and a management server connected to the client apparatus via a network to comprehensively manage the information about the paper handled by the client apparatus. The client apparatus transmits a paper ID request and document information to the management server when it carries out a printing operation, and the management server assigns a unique paper ID to each sheet of paper handled by the client apparatus based on the document information and the paper ID request. The management server transmits the paper ID back to the client apparatus, and simultaneously, it records the paper ID in association with the document information.

Preferably, the management server records the paper IDs and the document information in association with a client identifier, for the purpose of controlling the quantities of paper IDs assignable to various different client apparatuses.

This arrangement allows the management server to assign paper IDs evenly to various client apparatuses because the management server can determine which client apparatus requests what amount of paper IDs. For instance, if the amount of paper IDs assigned to a certain client apparatus exceeds a prescribed level, the service rate for assigning a paper ID is raised, or alternatively, assigning a paper ID to that client apparatus is temporarily suspended. In this manner, allocation of the server resources (i.e., paper IDs) can be controlled.

Taking into account trouble or fault on the network, it is desirable for the client apparatus to have a local manager that maintains a prescribed amount of unused paper IDs in advance. The local manager of the client apparatus transmits a paper ID request and document information containing a temporary document name to the management server. Upon receiving a set of paper IDs from the management server, the local manager records the paper IDs in association with the temporary document name in a local table.

With this arrangement, even when the network is disconnected, the client apparatus itself assigns a paper ID to the paper when printing a certain document.

In order to reduce the work load on the management server and improve the management efficiency, the paper identification information management system employs a management hierarchy in which an intermediate server is inserted between the management server and the client apparatus. The intermediate server holds a certain quantity of paper IDs that are allocated in advance by the management server. When receiving a paper ID request and document information from the client apparatus, the intermediate server assigns a paper ID to each sheet of paper handled by the client apparatus. The intermediate server may be provided in each geographic area, for each category of business, or each type of industry.

In the second aspect of the invention, a paper identification information management system includes a client apparatus that handles a sheet of paper bearing prescribed information, and a management server connected to the client apparatus via a network to comprehensively manage information about the paper handled by the client apparatus. The client apparatus has a writing unit for writing on the paper bearing a unique paper ID, and an optical reader for reading the paper ID and writing from the paper. The client apparatus transmits the paper ID read from the paper to the management server via the network, and the management server searches for a document name that is associated with the paper ID and supplies the document name to the client apparatus.

With this arrangement, the client apparatus inquires of the management server about the correspondence between the paper ID and the document name. Upon receiving the document name from the management server, the client apparatus can determine what document is to be combined with the handwriting read from the paper. This type of comprehensive and centralized management at the server is necessary and useful because it can reduce the work load on each client apparatus handling a great amount of paper.

In the third aspect of the invention, a paper identification information management server (which may be simply referred to as a "management server") is provided. The management server is connected via a network to a client apparatus that handles a sheet of paper bearing prescribed information. The management server comprises a paper ID assigning unit that assigns a paper ID to each sheet of paper handled by the client apparatus in response to a paper ID request and document information transmitted from the client apparatus, and a management table that records the paper ID assigned to the paper in association with the document information.

Preferably, the management table records the paper ID and the document name, in association with the identifier of the client apparatus. In this case, the management server further comprises a service charge control unit that determines a service charge to the client apparatus in accordance with the quantity of paper IDs assigned to the paper handled by the client apparatus.

In the fourth aspect of the invention, a client apparatus is provided. The client apparatus comprises (a) a pen having a writing unit for writing on a sheet of paper that bears a unique paper ID, and an optical reader for reading information from the paper, and (b) a transmission control unit that receives the information read by the pen, extracts the paper ID from the information, and specifies an application required to process the information based on the extracted paper ID.

If the necessary application is installed in the client apparatus, the data transmission control unit activates the application. If the necessary application is not installed in the client apparatus, the data transmission control unit transmits the extracted paper ID to a remote server and downloads the required application.

With this arrangement, the application required to process the information is automatically activated in the client apparatus based on the paper ID.

BRIEF DESCRIPTION OF THE DRAWINGS

Other objects, features, and advantages of the present invention will become more apparent from the following detailed description when read in conjunction with the accompanying drawings, in which:

FIG. 3 illustrates an example of the identification information table used in the management server shown in FIG. 2;

FIG. 9A and FIG. 9B illustrate applications of the paper identification information management system of the present invention;

FIG. 10 illustrates the structure and the behavior of the client apparatus according to the fifth embodiment of the invention; and FIG. 11 illustrates an operation flow of the transmission control unit of the client apparatus shown in FIG. 10.

DETAILED DESCRIPTION OF THE EMBODIMENTS

The details of the present invention will now be described with reference to the attached drawings.

Figure 1:
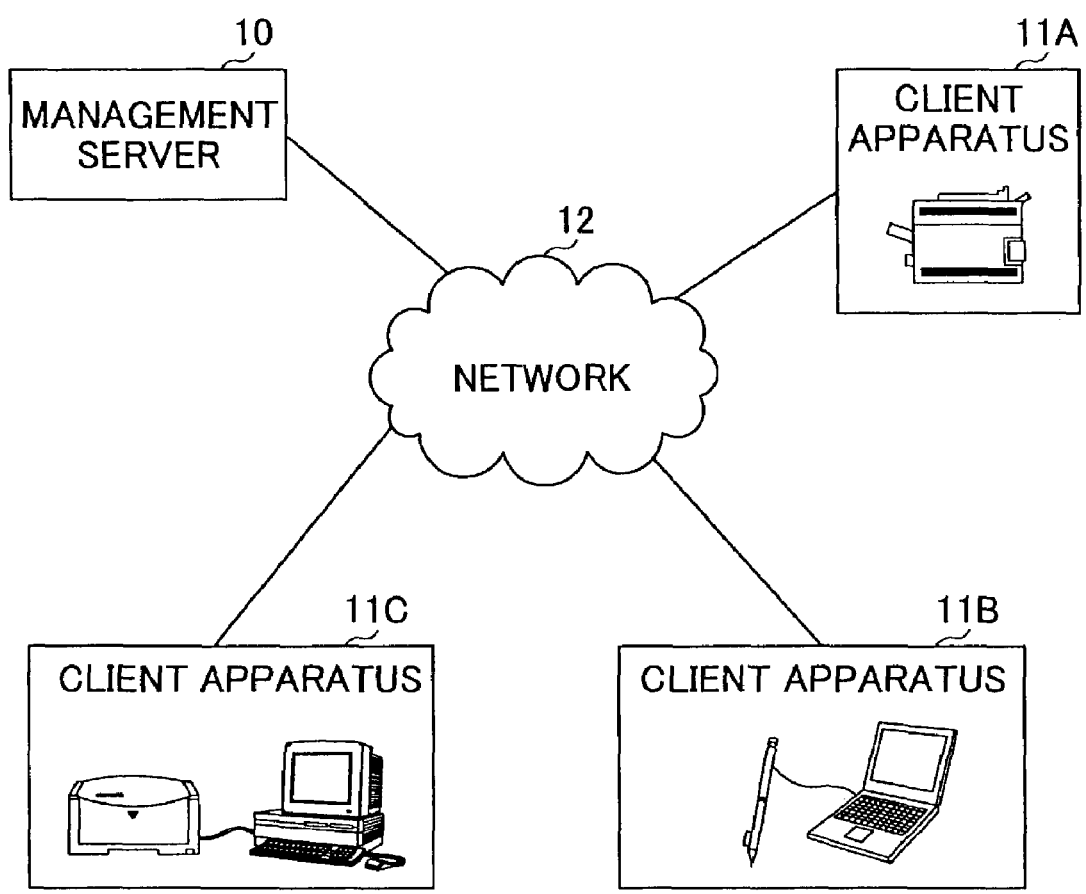
FIG. 1 schematically illustrates the network structure of a paper identification information management system according to the invention.

FIG. 1 is a schematic diagram of the paper identification information management system according to the invention. Multiple client apparatuses 11A-11C are connected to the paper identification information management server (hereinafter, simply referred to as a "management server") 10 via the network 12. The management server 10 assigns a paper ID to each sheet of paper handled by the client apparatuses 11A-11B. The paper IDs assigned to the client apparatuses are unique over the network, so that the management apparatus 10 can comprehensively manage the identification information of the paper. Each sheet of paper handled by the client apparatus 11 bear a symbol, which represents the coordinate information of each position on the paper and the paper identification (ID) information given by the management server 10.

Many types of client apparatuses 11 are connected to the management server 10. For example, the client apparatus 11A is an intelligent printer having both a printing function and a data processing function. Client apparatus 11B is a combination of a data processor, such as a personal computer (PC), and a pen furnished with an optical reader and connected to the data processor. Client apparatus 11C is a combination of a data processor, such as a personal computer (PC), and a general-purpose printer connected to the data processor. Although not shown in FIG. 1, a combination of a data processor, a pen and a printer can also be a client apparatus.

Figure 2:
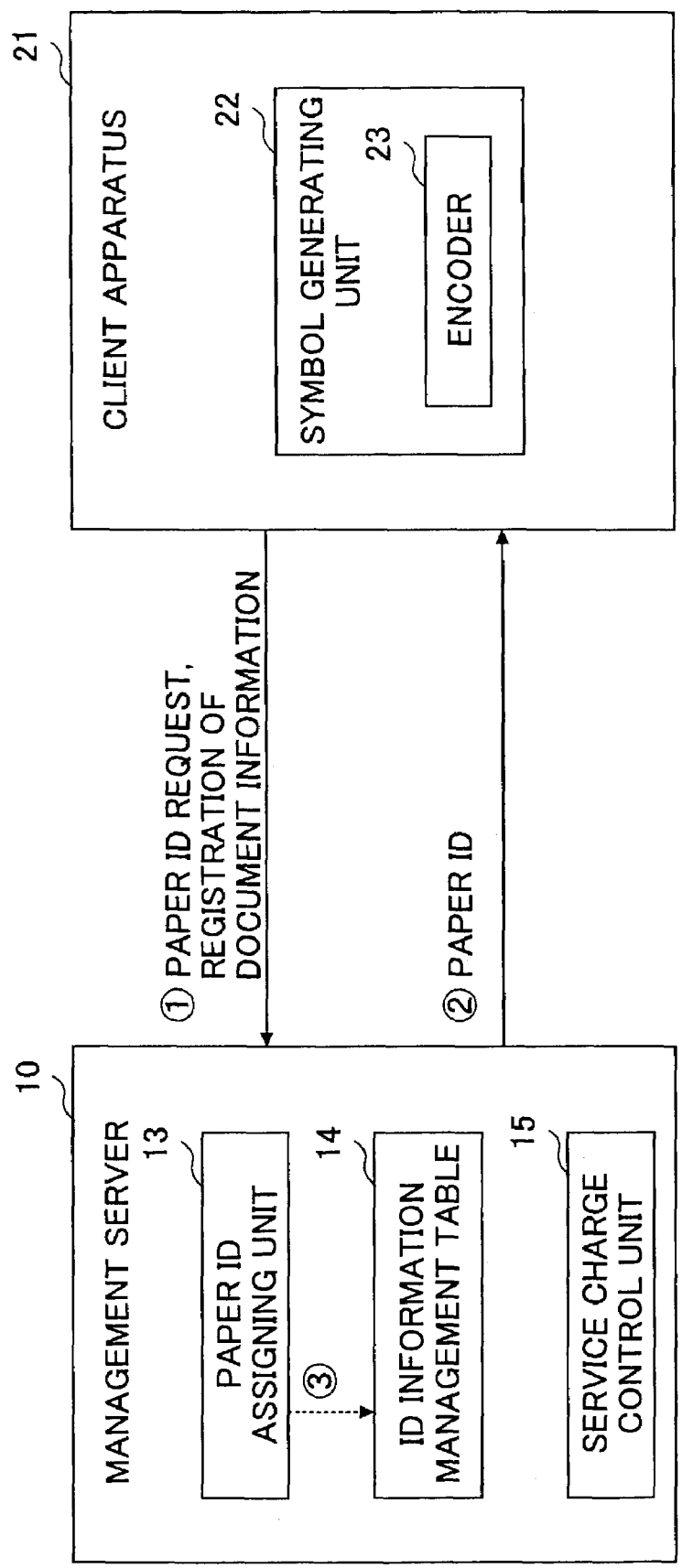
FIG. 2 illustrates the structures and the behaviors of the management server and the client apparatus according to the first embodiment of the invention.

FIG. 2 illustrates the structures and the behaviors of the management apparatus 10 and the client apparatus 21 according to the first embodiment of the invention. The management server 10 comprises a paper ID assigning unit 13, an identification information management table (hereinafter, simply referred to as a "management table") 14, and a service charge control unit 15. The paper ID assigning unit 13 assigns a unique paper ID to each paper treated by the client apparatus 21. The management table 14 records the paper ID assigned to the client apparatus 21 in association with the prescribed information. The service charge control unit 15 controls the amount of charge on the client apparatus in accordance with the quantity of the paper IDs assigned to the client apparatus 21.

In the first embodiment, the client apparatus 21 has a printing function, and is, for example, an intelligent printer in which a printing function and a data processing function are integrated, or a combination of a user printer and a personal computer (PC). When carrying out a printing operation, the client apparatus 21 receives a paper ID for each paper from the management server 10. The client apparatus 21 has an encoder 23 that encodes the paper ID as well as the coordinate information of the paper. The symbol generating unit 22 produces a symbol from the encoded information. The client apparatus 21 then outputs the produced symbol together with the document on the paper.

The symbol can be an arbitrary one, as long as the coordinate information and the paper ID are represented. Accordingly, the paper ID may be represented as a symbol without subjecting to the encoding process. In this case, the client apparatus 21 does not has to include the encoder 23. One example of the symbol is a two-dimensional pattern consisting of fine dots. Although the pattern is printed on the paper together with the text, each dot or the pattern itself cannot be recognized by human eyes because only a light gray tone appears on the paper.

In operation, when the client apparatus 21 carries out a printing operation, a paper ID request and the document information relating to the printing operation are transmitted to the management server 10 from the client apparatus 21 (procedure (1)). The document information includes the document name and the number of pages of that document. For example, if a two-page document is going to be printed under the document name of http://foo/doc/foo.doc, the client apparatus 21 transmit this document information to the management server 10 together with the paper ID request. Based on the document information, the management server 10 determines that paper IDs for two sheets of paper are required for the client apparatus 21. Then, the management server 10 assigns a unique paper ID to each of these sheets of paper, and transmits the paper IDs to the client apparatus 21 (procedure (2)).

The number of pages of the document does not always agree with the number of sheets used to print the document. For instance, a one-page document of the A3-size is created as electronic data, and it may be printed on two A4-size sheets of paper. In this case, two paper IDs are required. Such a printing format is also contained in the document information from the client apparatus 21, and the management server 10 determines the necessary number of sheets from the document information to assign paper IDs. The paper IDs assigned to the client apparatus 21 are stored in association with the document information supplied from the client apparatus 21 in the management table 14 (procedure (3)).

FIG. 3 illustrates an example of the identification information management table 14. The management table 14 has entries, each corresponding to a sheet of paper. Each entry has data fields of document name, the number of pages, paper, ID, client IDS, and printed time. The last data field allocated for "printed time" is provided to store private data (i.e., the property) of the client apparatus 21. Allowing the management server 10 to store the private data improves the convenience of the client apparatus 21. When the client apparatus 21 wishes to record some information in conjunction with the paper ID, it is unnecessary to construct a new system inside the client apparatus 21, and instead, management of such information can be left to the management server 10.

In the example shown in FIG. 3, the first and second lines of the table 14 store the information about the first and second pages of the document http://foo/doc/foo.doc. Paper IDs "0001" and "0002" are assigned to the respective pages of this document. The third line of table 14 stores the information of document http://foo/doc/goo.doc transmitted from another client apparatus. A paper ID "0003" is assigned to a single page of this document. Paper IDs unique on the network can be produced by incrementing the value.

By the way, the amount of information processed by the management server 10 is limited. If the client apparatus 21 accesses the management server 10 without any restriction, the management ability of the management server 10 may be adversely affected. Therefore, the service charge control unit 15 monitors the management table 14 to check the current quantity of paper IDs assigned to each of the client apparatuses, with reference to the client IDs recorded in the management table 14. If the quantity of paper IDs assigned to a certain client apparatus exceeds a predetermined level, then, the service charge control unit 15 raises the service rate for further assignment of the paper IDs. This arrangement is efficient to even the allocation of paper IDs among various client apparatuses.

Alternatively, if the management server 10 is not furnished with the service charge control unit 15, the paper ID assigning unit 13 may monitor the current quantity of paper IDs assigned to each of the client apparatuses. If the quantity of paper IDs assigned to a certain client apparatus reaches a predetermined level, the paper ID assigning unit 13 suspends further assignment of the paper IDs to that client apparatus.

The client ID may be a network identifier, such as the IP address or the machine name of the client apparatus. Alternatively, the user name may be transmitted from the client apparatus to the management server 10, together with the paper ID request and the document name. As necessary, the password may be transmitted simultaneously with the user name, or the user name may be encrypted.

Upon receiving the paper ID from the management apparatus 10, the client apparatus 21 encodes the paper ID and the coordinate information to produce a symbol, which is then printed on paper together with the document (including text and images). The coordinate information may take any form. For example, the top left corner of the paper is set to "0101", and the lower two digits are incremented to "0102", "0103" . . . , "01xx" toward the right side along the X axis. The higher two digits are incremented from "0101" to "0201" . . . , "yy01" toward the bottom of the paper along the Y axis.

If the document http://foo/foc/foo.doc shown in the table 14 of FIG. 3 is printed, the coordinate information is combined with the paper ID of each page, and identification information of "00010101" . . . , "0002yyxx" is created. In this example, the higher four digits represent the paper ID, and the lower four digits represent the coordinate information; however, the present invention is not limited to this example. This identification information is encoded and a symbol is produced.

When the client apparatus 21 prints the same document on later occasion, the management server 10 again receives the paper ID request and the document information. The management server 10 searches the management table 14, and determines that the paper ID has already been assigned to this document. Then, the management server 10 transmits the corresponding paper ID back to the client apparatus 21.

With the arrangement of the first embodiment, the management server 10 is capable of controlling the paper ID information in association with the document name via the network, even if a mass of paper is handled among a number of client apparatuses. In addition, by monitoring the accessing status of the respective client apparatuses, allocation of the paper IDs can be even among the client apparatuses.

Figure 4:
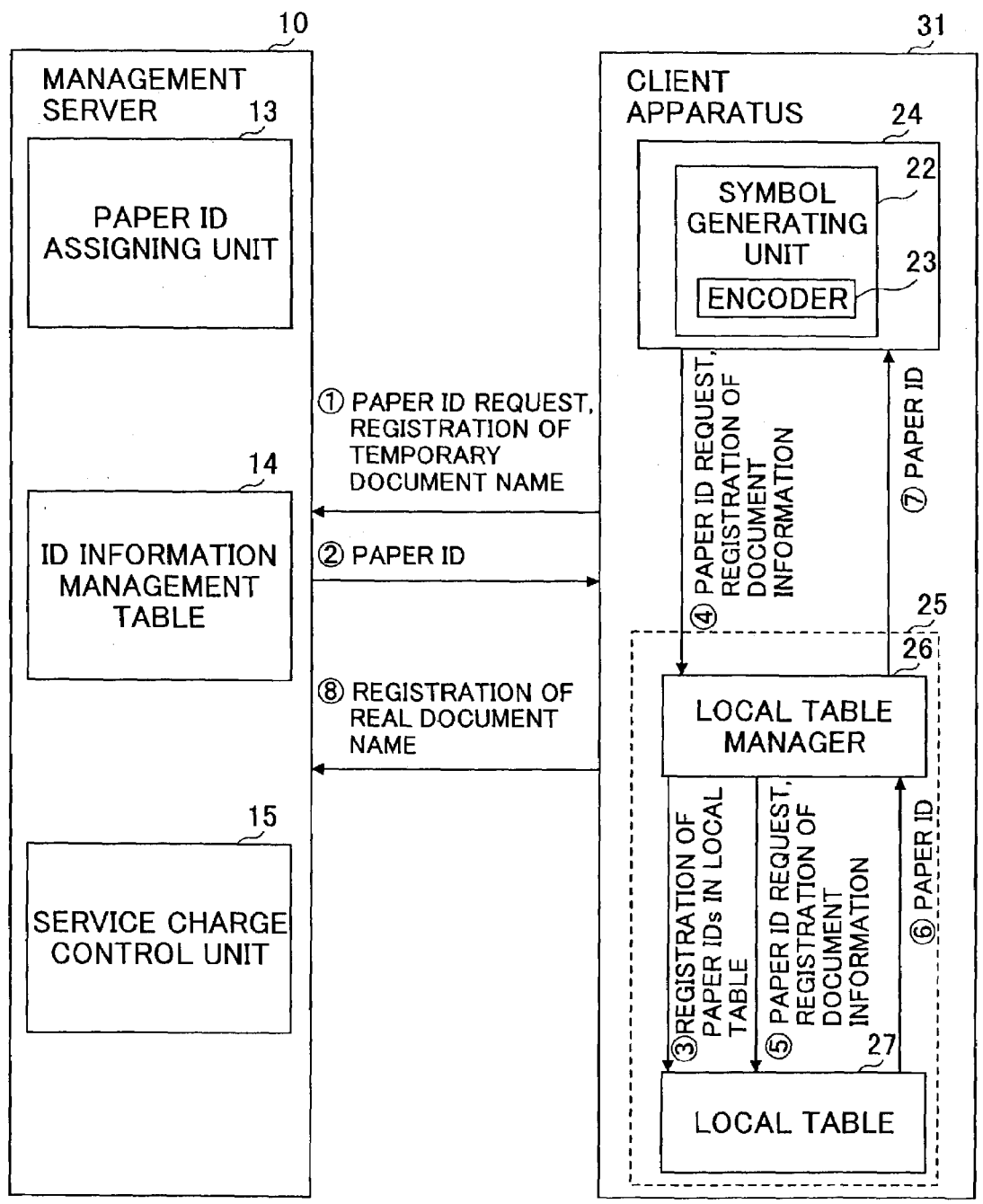
FIG. 4 illustrates the structures and the behaviors of the management server and the client apparatus according to the second embodiment of the invention.

FIG. 4 illustrates the structures and the behaviors of the management server 10 and the client apparatus 31 according to the second embodiment of the invention. In the second embodiment, trouble or fault on the network is taken into consideration, and a certain amount of paper ID information is allocated in advance to the client apparatus 31. This arrangement can avoid the situation in which a document cannot be printed because of failure of connection with the management server 10, while reducing the work load on and the traffic to the management server 10.

The structure of the management server 10 is the same as that in the first embodiment. The client apparatus 31 includes a data processor 24 with printing function, which is capable of producing and printing symbols, and a local manager 25. The data processor 24 with printing function is, for example, an intelligent printer. The local manager 25 has an identification information local table (hereinafter, simply referred to as a "local table") 27 for storing a predetermined amount of unused paper IDs, and a local table manager 26 for managing the local table 27.

In order to receive a set of unused paper IDs, the local manager 25 of the client apparatus 31 transmits a paper ID request and document information containing a temporary document name to the management server 10 (procedure (1)). For example, the client apparatus 31 requests the management server 10 to assign paper IDs for one hundred sheets of paper under the temporary document name. In place of the temporary document name, a symbol or a code representing that the current paper ID request is provisional may be used.

In response to the request, the management server 10 assigns paper IDs for one hundred sheets, and transmits the set of paper IDs to the client apparatus 31 (procedure (2)). At the same time, the management server 10 records the paper IDs in association with the temporary document name and the client ID in the management table 14. Upon receiving the seat of paper IDs, the local table manager 26 of the client apparatus 31 stores the paper IDs in association with the temporary document name in the local table 27 (procedure (3)).

When the client apparatus 31 actually prints a document, the data processor (or the intelligent printer) 24 supplies the document information to the local manager 25, requesting a paper ID (procedure (4)). The local manager 25 searches the local table 27 to extract paper IDs for necessary pages of the document, while replacing the temporary document name with the real document name in the entries of the extracted paper IDs based on the document information (procedures (5) and (6)). Then, the local manager 25 supplies the paper IDs to the data processor 24 (procedure (7)). The local manager 25 informs the management server 10 of the real document name and the used paper IDs (procedure (8)). The management server 10 replaces the temporary document name recorded in the management table 14 with the real document name supplied from the client apparatus 31.

If the client apparatus 31 has consumed paper IDs for fifty pages through printing operations (procedures (4), (5), (6), and (7)), then the local manager 25 again transmits a paper ID request and document information containing another temporary document name. When receiving another set of paper IDs from the management server 10, the client apparatus 31 stores these paper IDs in the local table 27 (procedures (1), (2), and (3)). If the connection to the management server 10 is unsuccessful, the client apparatus 31 tries to access the management server 10 after a certain time period.

In this manner, the local manager 25 keeps a certain amount of unused paper IDs so as to make these paper IDs available for the data processor 24. This arrangement guarantees printing operations even if the client apparatus 31 cannot be connected to the management server 10 due to failure of the network.

In addition, the work load on and the traffic to the management server 10 can be reduced.

Figure 5:
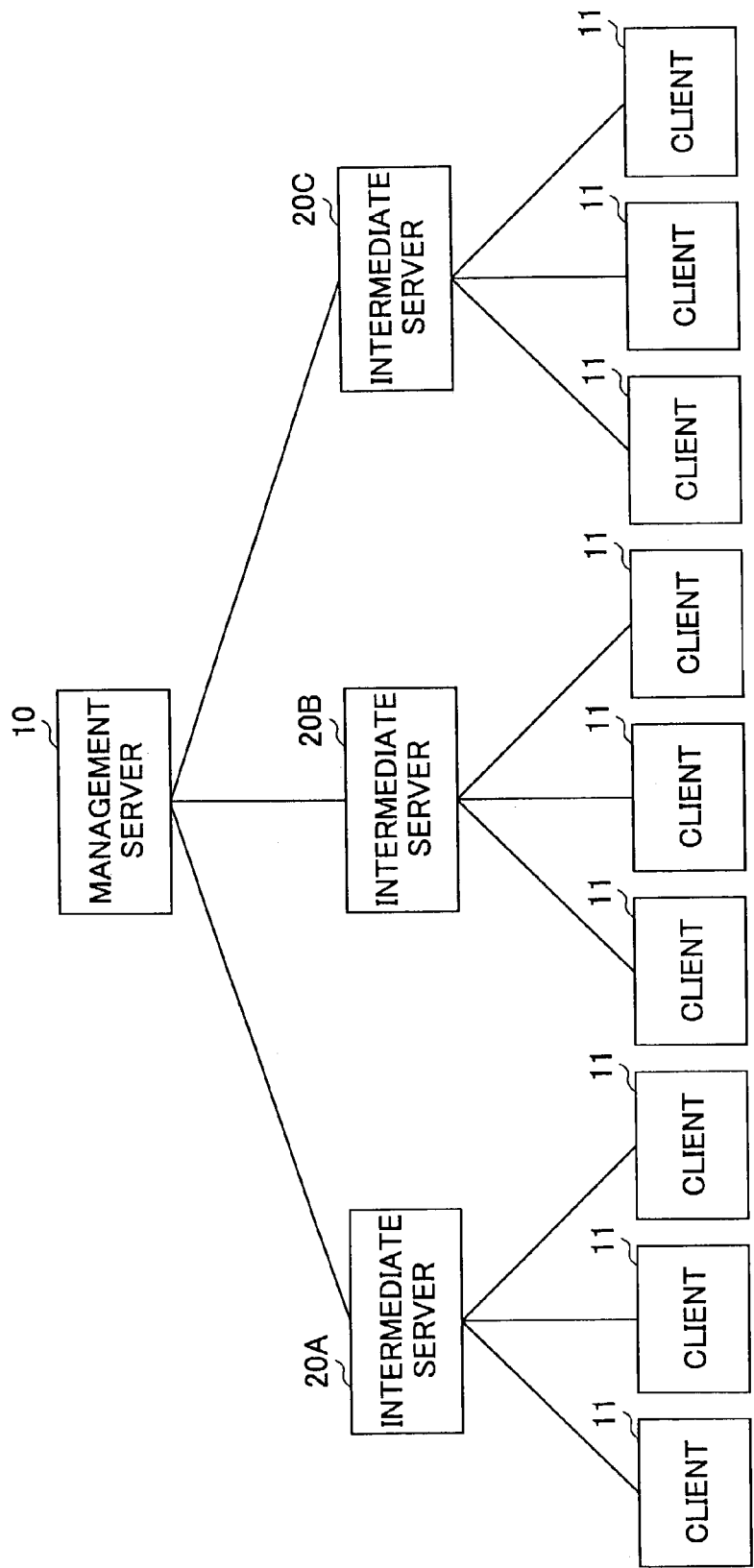
FIG. 5 illustrates an example of the management hierarchy employed in the paper identification information management system of the invention.
Figure 6:
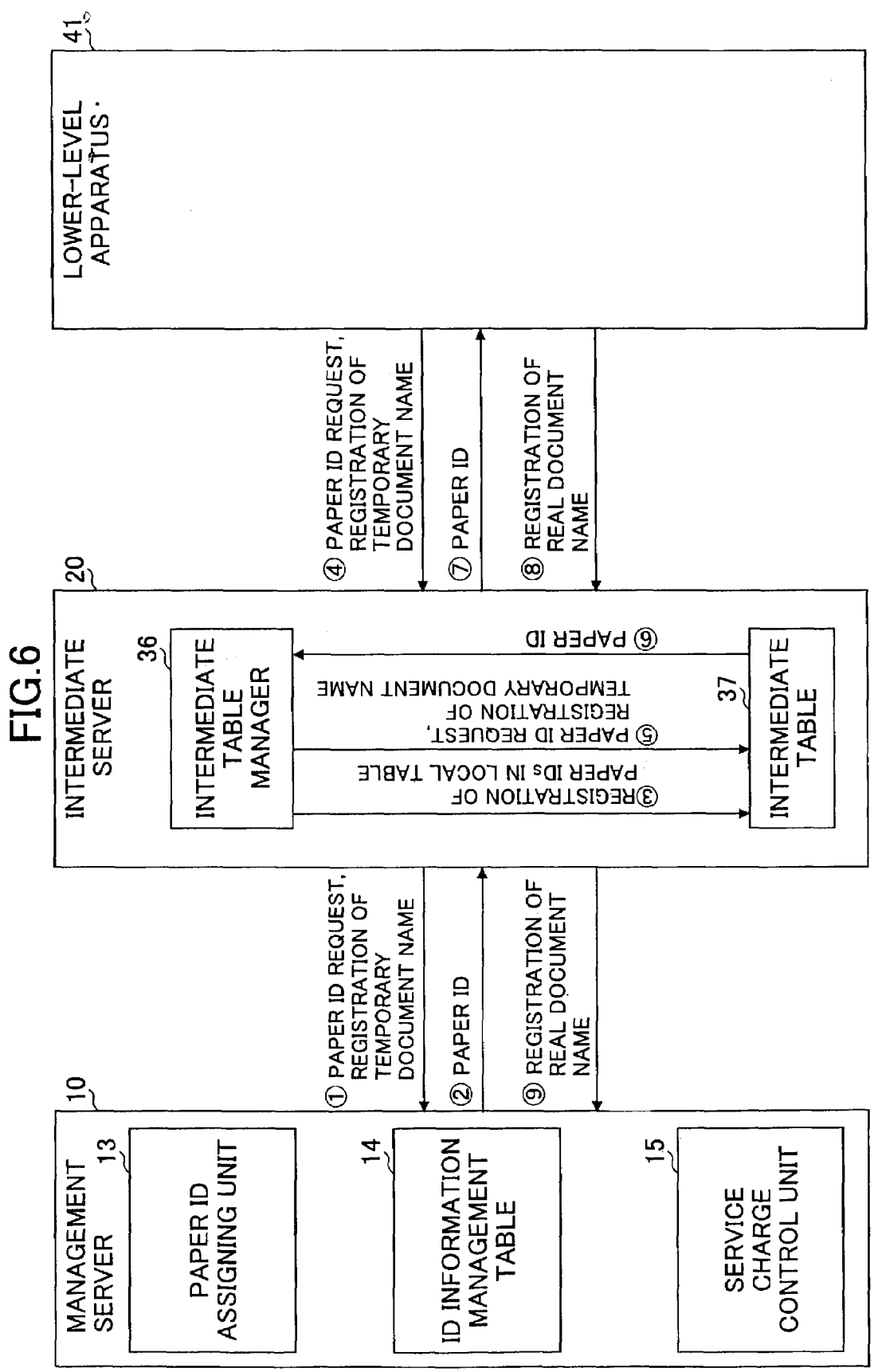
FIG. 6 illustrates the structure and the behavior of the intermediate server inserted between the management server and the client apparatus according to the third embodiment of the invention.

FIG. 5 and FIG. 6 illustrate the structure of the paper identification information management system according to the third embodiment of the invention. In the third embodiment, the system has a multi-layer management hierarchy, which is advantageous when the system scale is large.

As illustrated in FIG. 5, intermediate servers 20A, 20B, and 20C are inserted between the management server 10 and the client apparatuses 11. The intermediate server 20 is placed for each geographical area or each business category, for example. The client apparatus 11 accesses the intermediate server 20 to acquire paper IDs, instead of directly accessing the management server 10.

In the example shown in FIG. 5, each client apparatus 11 is connected to a single intermediate server 20 for the sake of convenience in illustration. However, the client apparatus 11 connected to the intermediate server 20A can also be connected to other intermediate servers 20B and 20C. Similarly, the client apparatus 11 connected to the intermediate server 20B can also be connected to other intermediate servers 20A and 20C.

In FIG. 5, only a single layer of intermediate servers 20 is inserted; however, a lower layer of second intermediate servers may also be inserted in this hierarchy. This arrangement can further reduce the work load on and the traffic to the management server.

FIG. 6 illustrates the structure and the behavior of the intermediate server 20. The intermediate server 20 is connected to an upper-layer server (i.e., the management server 10 in the example of FIG. 6) and to a lower-layer apparatus 41. The lower-layer apparatus 41 may be a lower-layer intermediate server, or alternatively, it may be a client apparatus. If the lower-layer apparatus 41 is a lower-layer intermediate server, it has the same structure as the intermediate server 20. If the lower-layer apparatus 41 is a client apparatus, it has the same structure as that illustrated in the first or second embodiment. In the third embodiment, the lower-layer apparatus 41 is a client apparatus.

The intermediate server 20 has an intermediate table manager 36 and identification information intermediate table (hereinafter, simply referred to as an "intermediate table") 37. The intermediate server 20 stores a certain amount of paper IDs in the intermediate table 37, which are assigned from the management server 10 in advance. The intermediate table manager 36 manages information recorded in the intermediate table 37.

In operation, the intermediate server 20 requests the management server 10 to assign paper IDs for a predetermined amount of paper under a temporary document name (procedure (1)). In response to the paper ID request, the management server 10 assigns paper IDs for necessary amount of paper, and transmits the paper IDs to the intermediate server 20 (procedure (2)). Simultaneously, the management server 10 records the paper IDs assigned to the intermediate server 20 in association with the temporary document name in the management table 14. The intermediate table manager 36 of the intermediate server 20 stores the assigned paper IDs in the intermediate table 37, in association with the temporary document name (procedure (3)).

When the intermediate server 20 receives a paper ID request under a temporary document name from a lower-layer apparatus (e.g., the client apparatus) 41 (procedure (4)), the intermediate table manager 36 searches the intermediate table 37, and assigns paper IDs for necessary amount of paper from the stored paper IDs (procedures (5) and (6)). Simultaneously, the intermediate table manager 36 registers the temporary document name of the client apparatus 41 over the previously recorded temporary document name of the intermediate server 20, in association with the client ID. Then, the intermediate server 20 transmits the paper IDs to the client apparatus 41 (procedure (7)).

When intermediate server 20 receives a real document name from the client apparatus 41 (procedure (8)) along with the actual printing operation in the client apparatus 41, the intermediate server 20 informs the management server 10 of this real document name (procedure (9)). This is because the management server 10 has to manage the paper IDs in association with the real document name used in the client apparatus over the network in a comprehensive manner. Upon receiving the real document name, the management server 10 writes the real document name over the temporary document name in the entries of the corresponding paper IDs. Although not shown in the figure, the intermediate server 20 may also register the real document name transmitted from the client apparatus 41 in the intermediate table 37 when transmitting this real document name to the management server 10.

If the client apparatus 41 employs the structure shown in FIG. 2 described in the first embodiment, the client apparatus 41 does not have a local manager. Accordingly, a paper ID request and document information containing a real document name are transmitted from the client apparatus 41 in procedure (4). In this case, the intermediate table manager 36 assigns paper IDs for the necessary amount of paper from the stored paper ID set, and records the real document name in the entries of the assigned paper IDs. Simultaneously, the intermediate server 20 informs the management server 10 of the real document name and the paper IDs assigned to the client apparatus 41. The management server 10 searches the management table 14 for the corresponding paper IDs, and replaces the recorded temporary document name with the real document name.

In this manner, the management server 10 collects information from the intermediate serves 20, and comprehensively manages the paper IDs and corresponding document names, in association with the client IDs. The service charge control unit 15 monitors the management table 14 to determine if the quantity of paper IDs assigned to the client apparatus 41 is at or below the prescribed level. If the quantity of paper IDs assigned to the client apparatus 41 exceeds the prescribed level, the service charge control unit 15 raises the service rate for further assignment of the paper IDs to prevent exclusive allocation of paper IDs.

In the third embodiment, by dispersing the function of the management server 10 to the intermediate servers 20, the work load on the management server 10 can be reduced.

Figure 7:
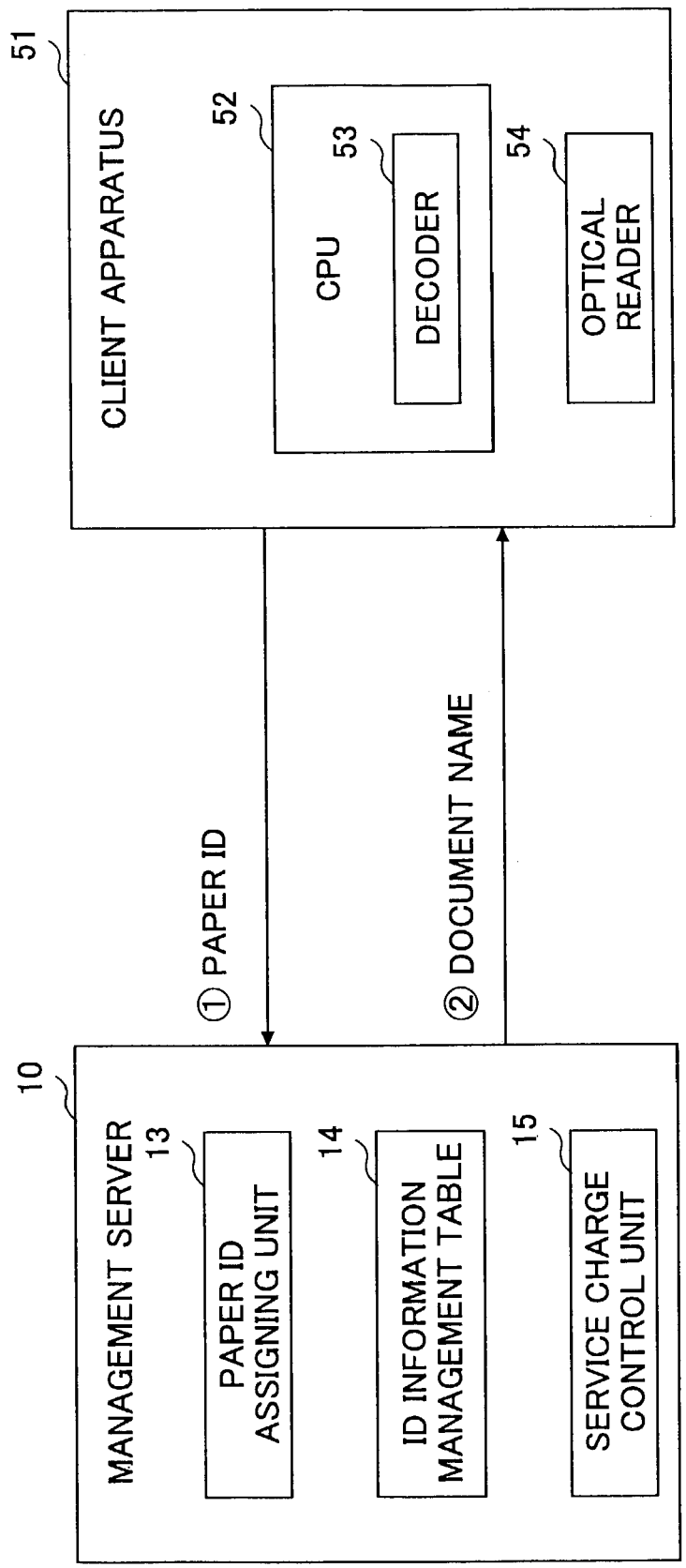
FIG. 7 illustrates the structures and the behaviors of the management server and the client apparatus according to the fourth embodiment of the invention.

FIG. 7 illustrates the structure and the behaviors of the management server 10 and the client apparatus 51 according to the fourth embodiment of the invention. In the fourth embodiment, the client apparatus 51 comprises a writing unit (not shown) for writing on a sheet of paper bearing prescribed information as symbols, an optical reader 54 that optically reads the symbols and handwriting from the paper, and a decoder 53 for decoding the symbols. The writing unit and the optical reader may be combined into a single unit. The symbol contains the paper ID and the coordinate information on the paper. The CPU 52 specifies the paper ID from the decoded data, and acquires the tracks of the handwriting based on the coordinate information.

Although the client apparatus 51 can read the paper ID from the symbol, it can not know to what document the handwriting is added. Accordingly, the client apparatus 51 transmits the paper ID read from the paper to inquire about the document name (procedure (1)). The management server searches the management table 14 to identify the document name that has been associated with the paper ID, and transmits the identified document name to the client apparatus 51 (procedure (2)).

For example, handwriting is added using the writing unit of the client apparatus 51 on a sheet of paper that bears the paper ID "0001". This paper ID is printed on the paper together with text or images prior to the proofreading, and at the same time, the paper ID is recorded in the management server 10 in association with the document name. The optical reader 54 of the client apparatus 51 optically reads the handwriting and the paper ID, and the CPU 52 decodes and specifies the paper ID "0001". From this paper ID "0001", the management server 10 can identify the document name http://foo/doc/foo.doc, and transmits this document name back to the client apparatus 51.

Upon acquiring the real document name, the client apparatus 51 can combine the handwriting read from the paper with the appropriate page of the original document. The CPU 52 incorporates the electronic data of the handwriting into the original text to which the handwriting is added.

Figure 8:
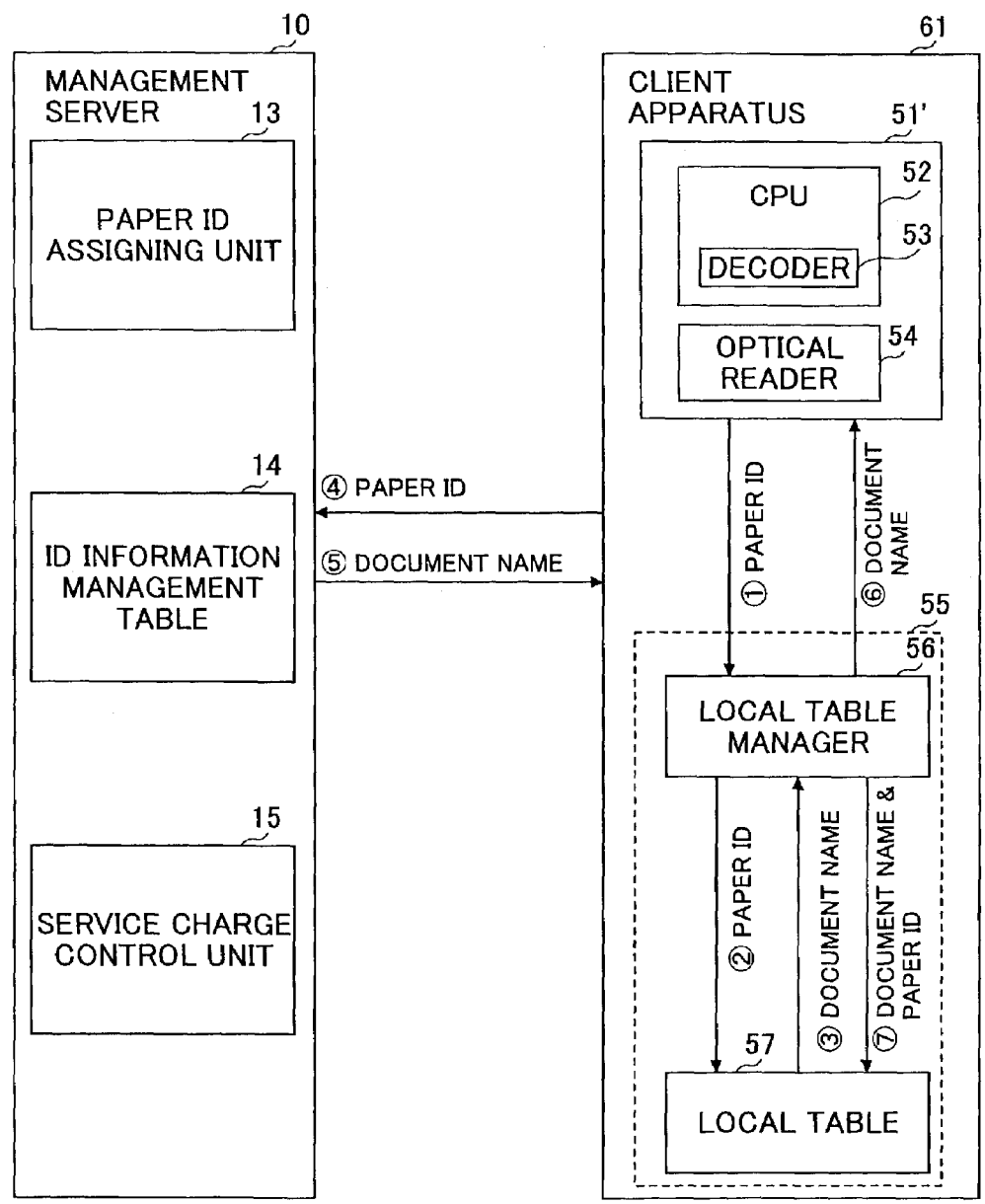
FIG. 8 illustrates a modification of the client apparatus according to the fourth embodiment of the invention.

FIG. 8 illustrates a modification of the fourth embodiment. With the structure shown in FIG. 7, the client apparatus 51 has to access the management server 10 every time the handwriting and the symbol representing the paper ID are read, and the system cannot deal with network failure and traffic increase. Therefore, in the modification, a certain amount of paper IDs and the associated document names are managed inside the client apparatus.

The client apparatus 61 comprises a handwriting data processor 51' having a write/read function and a data processing function, and a local manager 55. The local manager 55 has an identification information local table (hereinafter, simply referred to as a "local table") 57 and a local table manager 56 for managing the local table 57. The local table 57 records a certain amount of paper IDs in association with the corresponding document names.

When the handwriting data processor 51' reads the paper ID and the handwriting added onto a sheet of paper using a writing unit (not shown), the handwriting data processor 51' supplies the paper ID to the local manager 55 to inquire about the document name (procedure (1)). The local table manager 56 searches the local table 57 for the paper ID to identify the corresponding document name (procedures (2) and (3)). When the document name is identified from the local table 57, the local manager 55 feeds the document name back to the handwriting data processor 51' (procedure (6)).

If the paper ID read from the paper has not been recorded in the local table 57, the local manager 55 transmits the paper ID to the management server 10 to inquire about the document name (procedures (2) and (4)). The management server 10 searches the management table 14 for the target paper ID to identify the document name, and transmits the identified document name back to the client apparatus 61 (procedure (5)). The local manager 55 supplies the document name transmitted from the management server 10 to the handwriting data processor 51' (procedure (6)), and at the same time, it records the document name in the local table 57 in association with the paper ID (procedure (7)).

By acquiring the document name, the CPU 52 of the handwriting data processor 51' can combine the handwriting with the original document, thereby incorporates the electronic data of the handwriting into the original data of the document.

When additional notes are made by the handwriting data processor 51' on the paper in which the revised document is printed together with the paper ID, the local manage 55 does not have to query the management server 10 any longer. The local manager 55 searches the local table 57 for the paper ID read from the paper by the handwriting data processor 51' to specify the corresponding document name, and supplies the specified document name back to the handwriting data processor 51'.

As shown in FIG. 3, the identification information management table has a data field of private data, in which the printed time at the client apparatus is recorded. From this data field, it can be determined that the second page of the document http://foo/doc/foo.doc is printed again after some revise and editing. By providing the similar data field in the local table 57, the search efficiency of the client apparatus 61 can be improved.

By allowing the client apparatus 61 to hold a part of the information managed by the management server 10, the entire throughput of the network system can be improved. The structure shown in FIG. 8 is equally applicable to a multi-layer management hierarchy in which an intermediate server is inserted between the management server 10 and the client apparatus 61 as in the third embodiment.

Figure 9A:
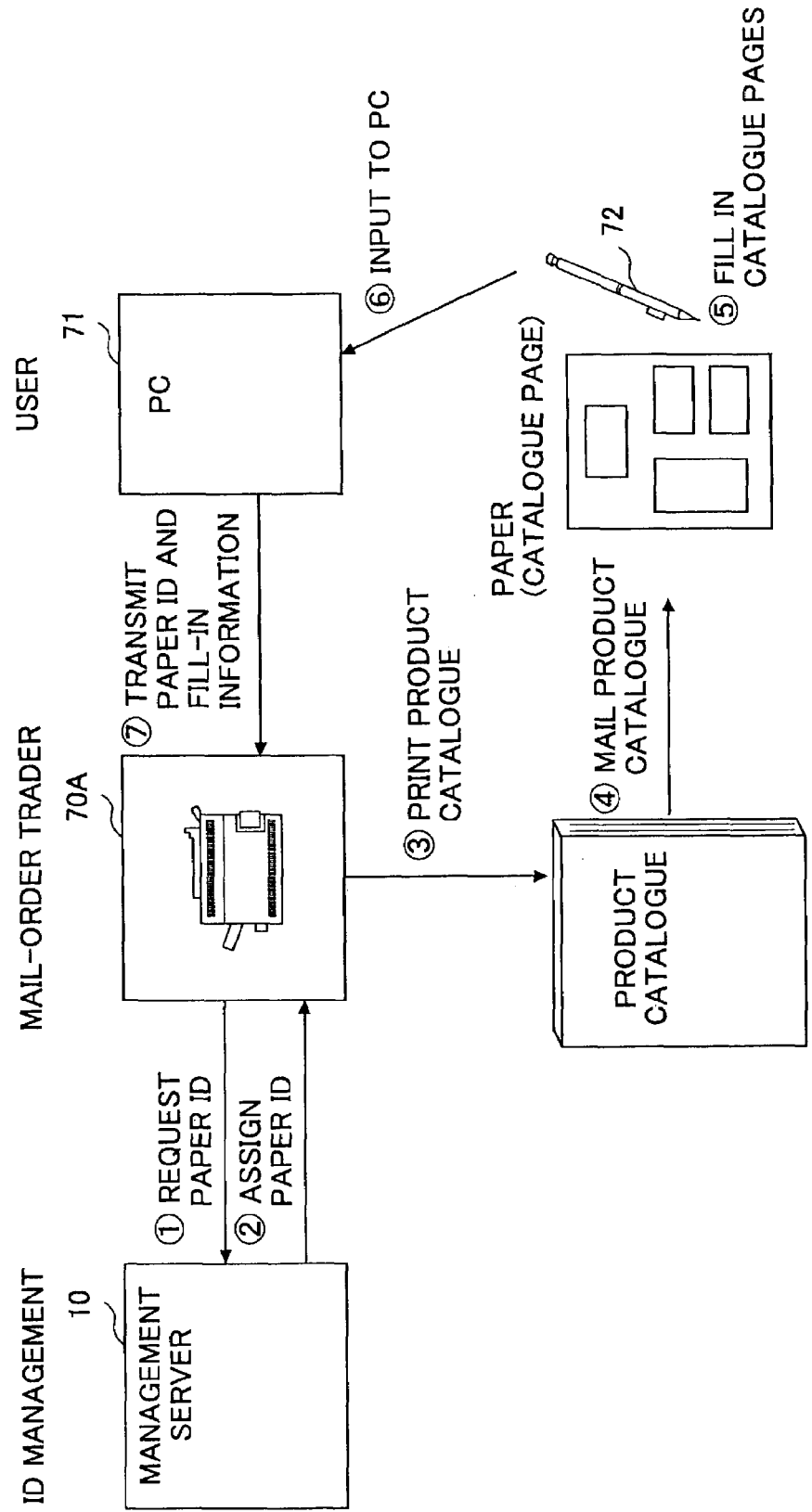

FIG. 9A and FIG. 9B illustrate examples of actual application of the paper identification information management system of the present invention. In FIG. 9A, the paper identification information management system is applied to mail-order business, and in FIG. 9B, the invention is applied to electronic tags (or labels).

In the example of FIG. 9A, when the mail-order trader produces a product catalogue, client apparatus 70A prints items for sale together with a paper ID for each page of the product catalogue. Accordingly, the client apparatus 70A of the mail-order trader transmits a paper ID request together with a document name for the catalogue to the management server 10 (procedure (1)). The management server assigns paper IDs for the necessary pages of the catalogue and transmits the paper IDs back to the client apparatus 70A (procedure (2)). The management server 10 also stores these paper IDs in association with the document name (or the catalogue name) and the client ID of the client apparatus 70A. The client apparatus 70A may store the assigned paper IDs in association with the catalogue name in the local table (not shown). Then, the mail-order trader publishes a product catalogue, printing symbols representing the coordinate information and the paper ID for each page (procedure (3)).

The product catalogue is sent to the user (procedure (4)). The user writes down necessary information, such as the address, the name, product number, the quantity, the method of payment, etc., using a pen 72 having an optical reader (procedure (5)). Alternatively, the user may simply check or mark in the check boxes of the items with the pen 72. In the latter case, which items are marked can be determined from the coordinates of the check boxes.

Then, the pen 72 is connected to the personal computer (PC) 71 to input the information read from the catalogue pages into the personal computer 71 (procedure (6)). The personal computer is furnished with a transmission control unit that controls data transmission with the pen 72, the details of which will be described later. The transmission control unit may be realized as software. In this case, the transmission control software and the pen 72 may be delivered to the user when the product catalogue is initially sent to the user. The transmission control software contains a list of paper IDs used for this product catalogue. By installing the transmission control software in the personal computer (PC) 71, the handwriting and the paper ID read from each page of the catalogue can be specified by the personal computer 71.

Then, the transmission control unit of the personal computer 71 transmits the contents of the handwriting and the specified paper IDs to the client apparatus 70A of the mail-order trader (procedure (7)). For the personal computer 71 of the user, the client apparatus 70A of the mail-order trader is a server.

The client apparatus 70A searches the local table (not shown) for the transmitted paper ID to specify the catalogue name (i.e., the document name). Alternatively, the client apparatus 70A may transmit the received paper IDs to the management server 10 to inquire about the catalogue name. Once the client apparatus 70A of the mail-order trader acquires the catalogue name, the client apparatus 70A can specify which items of which catalogue are selected by the user. Then, the mail-order trader ships the items to the user.

In the example shown in FIG. 9B, a tag maker sells a set of tags, each bearing a unique paper ID. To this end, the client apparatus 70B of the tag maker first transmits a paper ID request under a certain document name to the management server 10 (procedure (1)). The management server 10 assigns paper IDs for necessary sheets of tags, and transmits the paper IDs to the client apparatus 70B (procedure (2)). Simultaneously, the management server 10 records the paper IDs assigned to the client apparatus 70B in association with the document name and the client ID. The client apparatus 70B may also record the assigned paper IDs in association with the document name in the local table.

The tag maker produces a set of tags, printing symbols representing the paper ID and the coordination information in each tag (procedure (3)), and sells the tag (procedure (4)). The user buys the tag, and makes notes on the tag using the pen 72 having the optical reader (procedure (5)). Then, the pen 72 is connected to the personal computer (PC) 71 to input the information read from the tag into the personal computer 71 (procedure (6)). The personal computer 71 is installed with transmission control software and tag processing application software in advance. The transmission control software (or the transmission control unit) of the personal computer 71 acquires the paper ID and the notes from the data read from the tag by the pen 72. Then, the personal computer 71 sees the list of the paper IDs recorded in the transmission control software, and determines that the paper ID optically read by the pen 72 is given to a tag. Accordingly, the tag processing application is activated. The tag processing application processes the contents read by the pen 72 and pastes the notes on the desktop of the personal computer as electronic tags (procedure (7)).

Although not shown in a figure, the present invention may also be applied to revising text. In this application, a document that is to be revised is printed on a sheet of paper, together with symbols representing coordinate information and a paper ID. This paper ID is stored in association with the document name in, for example, the local table.

The user revises the printed text using a pen with an optical reader. After the revision, the pen is connected to a personal computer to input the data read from the paper. The personal computer is furnished in advance with a transmission control unit that is capable of communicating with the pen. Based on the paper ID and the corresponding document name, the transmission control unit determines that the handwriting added to the text is used for revising of the document. Consequently, the personal computer activates the revise application to automatically carry out correction of the original text in accordance with the added handwritings.

As apparent from the above-described applications, the user obtains sheets of paper bearing paper IDs from various sources. For example, the tag or the catalogue is obtained from the tag maker or the mail-order trader. The user may acquire paper IDs by himself or herself to print something together with symbols.

In spite of the variety of different sources of the paper IDs, the paper identification information can be controlled by the paper identification information management system in a comprehensive and centralized manner so that each paper ID assigned to every single sheet of paper is unique. Accordingly, the personal computer of the end user can automatically start the necessary process after the paper ID and the handwriting are taken from the pen, regardless of the source or the obtaining route of the paper.

Next, the automatic process carried out by the user terminal after handwriting is made on paper bearing symbols will be explained with reference to FIG. 10 and FIG. 11. FIG. 10 is a schematic diagram of the client apparatus according to the fifth embodiment of the invention, and FIG. 11 is a flowchart of the automatic operation carried out by the transmission control unit of the user terminal.

In FIG. 10, the client apparatus 80 comprises a user terminal 71, such as a personal computer, and a pen 72 connectable to the user terminal 71. The pen 72 is capable of writing on a sheet of paper bearing a paper ID, and of optically reading the paper ID and the writing made on the paper. The user terminal 71 has a transmission control unit 73 and a plurality of different types of application programs 74 through 77. In the example shown in FIG. 10, the user terminal 71 is installed with mail-order application 74, electronic tag application 75, revise application 76, and diary application 77.

The transmission control unit 73 receives the data of the handwriting and the paper ID from the pen 72, and determines what application is required to process the data read by the pen 72. Based on the determination, the transmission control unit 73 activates the necessary application. In addition, the transmission control unit 73 communicates with a remote server 90 as necessary. The remote server 90 may be the management server 10, the intermediate server 20, or a trader's server.

In operation, the transmission control unit 73 acquires the paper ID from the pen 72 (step S101). Then, it is determined whether the paper ID read by the pen 72 is maintained in the transmission control unit (TCU) 73 itself (step S103). If the paper ID is in the transmission control unit 73 (YES in step S103), the transmission control unit 73 extracts the document name corresponding to the paper ID, and base on the document name, it determines which application is required to process the data (step S105). If the paper ID read by the pen 72 is not maintained in the transmission control unit 73 (NO in step S103), then the transmission control unit 73 searches the local table (not shown) of the client apparatus 80 (step S107). If the paper ID is in the local table (YES in step S107), the transmission control unit 75 acquires the corresponding document name and specifies the necessary application (step S109). If the paper ID is not in the local table (NO in step S107), the transmission control unit 73 accesses the remote server (e.g., the management server 10) and acquires the document name from the server to specify the required application (step S111).

Once the document name is acquired and the application is specified, the transmission control unit 73 determines whether the application is registered in the transmission control unit, that is, whether the application has already been installed in the user terminal 71 of the client apparatus 80 (step S113). If the application has already been installed (YES in S113), the transmission control unit 73 transfers the data read by the pen 72 to the application (step S117).

If the specified application is not registered (NO in S113), the transmission control unit 73 accesses the management server 10 or the trader's server to download the required application (step S115). After the download, the transmission control unit 73 transfers the data read by the pen 72 to the application (step S117).

As a particular example, it is supposed that the user terminal 71 is installed with the mail-order application 74, the electronic tag application 75, and the revise application 76. On the other hand, the diary application 77 is not installed in the user terminal 71. In the transmission control unit 73, the paper IDs used in a product catalogue and the paper IDs used for a set of tags are stored in association with the respective document names.

When the user checks the product catalogue using the pen 72, the transmission control unit 73 extracts the document name based on the paper ID read by the pen 72, and determines that the paper ID is given to a certain page of the product catalogue (S101->S103-> S105). Then, the transmission control unit 73 activates the mail-order application 74, and transfers the data read by the pen 72 to this application program (S113-> S117). Based on the data, the mail-order application 74 determines which items have been marked, and transmits the order form to the server of the mail-order trader via a communication interface (not shown).

When the user prints out electronically created text for proofreading, a paper ID is assigned for this page from the local table (see FIG. 3) or the management server 10. The paper ID used for this page is recorded in association with the document name in the management table of the management server 10 and in the local table of the client apparatus 80. When the user has finished revising the text, and when the transmission control unit 73 has received the data of the paper ID and the writing from the pen 72, the transmission control unit 73 refers to the local table and acquires the corresponding document name (S101-> S103-> S107-> S109). Then, the transmission control unit 73 activates the revise application and transfers the data to this application (S113-> S117).

When the user buys a diary bearing symbols in each page, and when the user writes in the diary using the pen 72, the transmission control unit 73 cannot recognize the paper ID read by the pen 72. Then, the transmission control unit 73 queries the management server 10 about the paper ID to acquire the corresponding document name (S101-> S103-> S107 -> S111). From the acquired document name, the transmission control unit 73 determines that the diary application has to be activated; however this application is not installed in the client apparatus 80. Then, the transmission control unit 73 accesses the management server 10 to download the necessary application (S113-> S115). After the download, the transmission control unit 73 transfers the data read by the pen 72 to the application (S119).

In this manner, the transmission control unit 73 activates a required application based on the data read by the pen 72 to automatically carry out the appropriate process.

The arrangement of the fifth embodiment may be combined with the management hierarchy of the third embodiment. In this case, the paper IDs used among a number of client apparatuses can be efficiently managed in a centralized manner. The transmission control unit 73 queries the management server of the highest layer, and successively goes down to a lower-layer server if the necessary information is not obtained. Alternatively, the transmission control unit 73 queries the lowest-layer server, and successively goes up to a higher-layer server if the necessary information is not obtained. This type of multi-layered management hierarchy can disperse the work load of the management server and the intermediate servers.

As has been described above, paper identification information can be managed in a comprehensive and centralized manner among various types of client apparatuses. At the same time, the access status of each client apparatus is monitored to realize even distribution of paper IDs.

In addition, once handwriting is made on the paper bearing the symbols, the client apparatus can automatically start the required application to process the data read by the pen with an optical reader.

This patent application is based on and claims the benefit of the earlier filing dates of Japanese patent application No. 2002-109168 filed Apr. 11, 2002 and Japanese patent application No. 2003-103133, filed Apr. 7, 2003, the entire contents of which are hereby incorporated by reference.

What is claimed is:

1. A paper identification information management system comprises:

a client apparatus that handles a sheet of paper bearing prescribed information; and a management server connected to the client apparatus via a network to comprehensively manage the information about the paper handled by the client apparatus, wherein the client apparatus transmits a paper ID request and document information to the management server when it carries out a printing operation, and the management server assigns a unique paper ID to each sheet of paper handled by the client apparatus based on the document information and the paper ID request, transmits the paper ID to the client apparatus, and records the paper ID in association with the document information.

2. The paper identification information management system according to claim 1, wherein the management server records the paper ID and the document information in association with a client identifier to control a quantity of the paper IDs assignable to the client apparatus.

3. The paper identification information management system according to claim 1, wherein the document information includes a document name of a document to be printed and the number of pages of the document.

4. The paper identification information management system according to claim 1, wherein upon receiving the paper ID from the management server, the client apparatus encodes the paper ID to produce a symbol, and prints the symbol together with the document to be printed on the paper.

5. The paper identification information management system according to claim 1, wherein the client apparatus has a local manager that maintains a set of unused paper IDs, and wherein the local manager transmits the paper ID request and the document information that contains a temporary document name to the management server to obtain said set of paper IDs in advance, and upon receiving the paper IDs, the local manager stores the paper IDs in association with the temporary document name in a local table.

6. The paper identification information management system according to claim 5, wherein the client apparatus receives the paper ID from the local manager when the printing operation is carried out, and the local manager replaces the temporary document name recorded in the local table with a real document name relating with the printing operation.

7. The paper identification information management system according to claim 6, wherein the local manager transmits the real document name and the paper ID used for the printing operation to the management server, and the management server replaces the temporary document name recorded in the management table with the real document name.

8. The paper identification information management system according to claim 1, further comprising an intermediate server inserted between the management server and the client apparatus in a management hierarchy, wherein the intermediate server receives a set of paper IDs in advance from the management server, and when receiving the paper ID request from the client apparatus, the intermediate server assigns one of the paper IDs for each sheet of paper handled by the client apparatus in response to the paper ID request.

* * * * *